United States Patent [19]
Thom, Jr.

[11] Patent Number: 5,381,731
[45] Date of Patent: Jan. 17, 1995

[54] ROUND EXPANDING MODULAR STEAM CHAMBER

[75] Inventor: Kelsey C. Thom, Jr., Cedar Falls, Iowa

[73] Assignee: Roskamp Champion, Waterloo, Iowa

[21] Appl. No.: 62,357

[22] Filed: May 13, 1993

[51] Int. Cl.$^6$ .............................................. A23N 17/00
[52] U.S. Cl. ...................................... 99/516; 99/467; 99/471; 99/483
[58] Field of Search ............................. 99/485–487, 99/489, 534, 468, 471, 473, 536, 488, 516, 467, 483; 426/506, 507, 511

[56] References Cited

U.S. PATENT DOCUMENTS

| | | |
|---|---|---|
| 1,654,799 | 1/1928 | Forrest ............................. 99/467 |
| 2,299,046 | 10/1942 | West ................................ 99/467 |
| 2,631,099 | 3/1953 | Bonotto ........................... 99/534 |
| 4,508,029 | 4/1985 | Malone ............................ 99/516 |
| 4,817,518 | 4/1989 | Wyatt et al. ..................... 99/516 |
| 4,878,422 | 11/1989 | McCullough et al. ............. 99/471 |
| 4,898,092 | 2/1990 | Greer ............................... 99/516 |
| 4,939,988 | 7/1990 | Wyatt et al. ..................... 99/516 |
| 5,033,370 | 7/1991 | Fosbol et al. .................... 99/516 |
| 5,131,321 | 7/1992 | Brummelhuis .................... 99/516 |
| 5,133,982 | 7/1992 | Bodkin et al. .................... 99/516 |

OTHER PUBLICATIONS

"Steamiser" by Poarch Bros., Inc. (Brochure).

Primary Examiner—David A. Scherbel
Assistant Examiner—Patrick F. Brinson
Attorney, Agent, or Firm—Robert F. Palermo

[57] ABSTRACT

A vertical steam conditioning chamber, for feed grains and other steam conditioned particles, has a circular cross section and is formed from a plurality of stackable modules, each such module having a larger diameter than the module next above. A flange like member permits stacking and joining of the cylindrical modules and prevents the upper modules from telescoping downward into the modules below. This permits generation of a stepwise diametric expansion or even a variable stepwise diametric expansion in a conditioning chamber to accommodate different conditioning responses of different particulate materials. The ratio of cylindrical module height to diameter and the change thereto from one module to the next succeeding module provides the versatility and the variability of the stepwise diametric expansion.

6 Claims, 1 Drawing Sheet

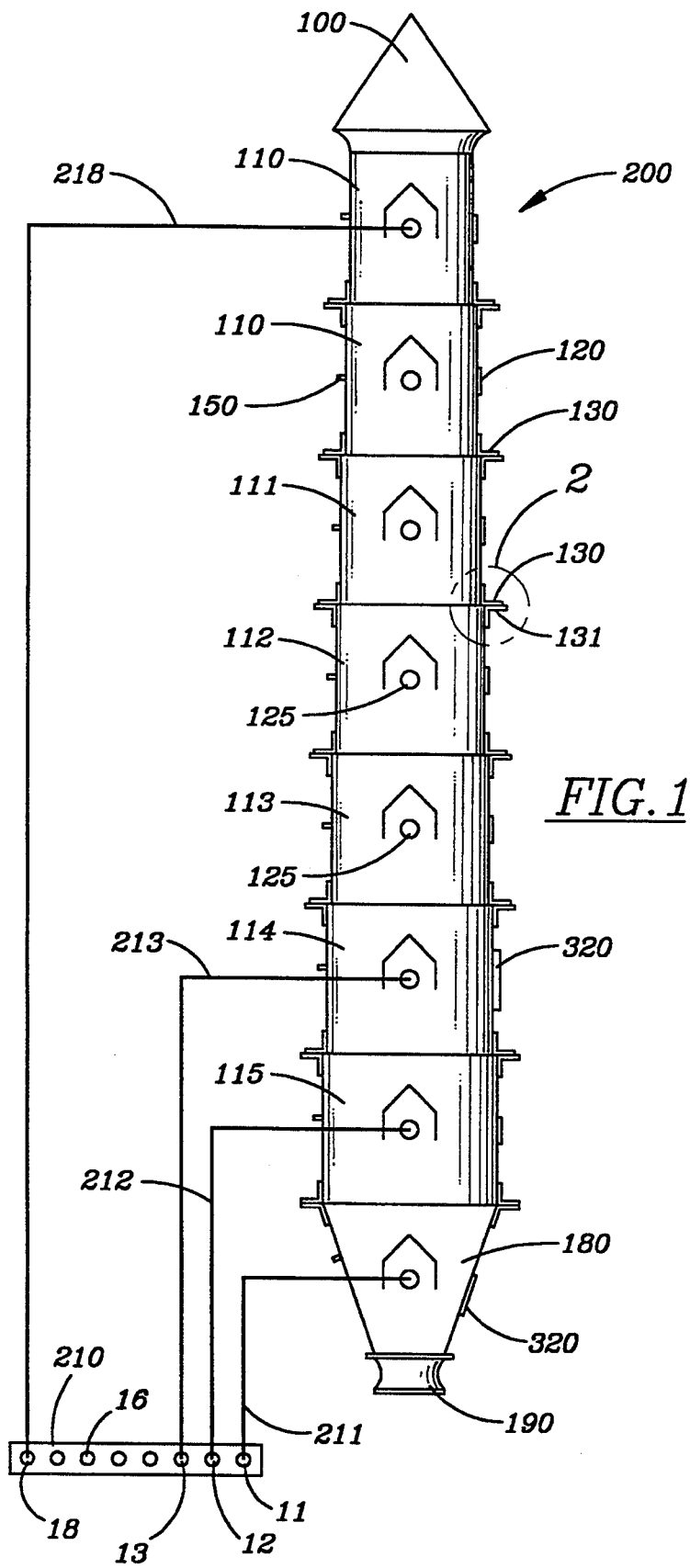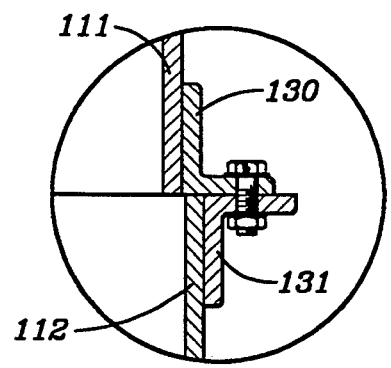

ROUND EXPANDING MODULAR STEAM CHAMBER

BACKGROUND OF THE INVENTION

This invention relates generally to steam conditioning of feed grains and more particularly to a vertical steam chamber for such conditioning which resists plugging or bridging due to grain expansion and softening during conditioning.

Steam conditioning is an important part of processing for feed grains in preparation for flaking, or pelleting, or other forming operations. Such conditioning moisturizes, softens, and aids in sterilization of the grains prior to forming. It is fairly common for conditioning to be performed in vertical chambers in which the grain is fed from the top of the chamber and discharged from the bottom. Steam for conditioning is fed at the bottom of the chamber and at intermediate locations along the height of the chamber to provide a counterflowing steam environment within the chamber. Both circular and rectangular cross sections can be found in vertical conditioning chambers presently available. In addition, both tapered and straight sided chambers can be found. Straight sided chambers have either cylindrical or rectangular geometries having the same cross section at both top and bottom of the chamber. Tapered chambers have conic or trapezoidal geometry which is larger at the bottom than at the top.

During operation, the grain being conditioned expands and softens due to the increase of moisture content and temperature induced by the steam conditioning. As a consequence, there is a tendency for the grain to jam or plug the conditioner due to friction and bridging of the expanding softening grain. This tendency to jam the conditioner is reduced somewhat by the tapered conditioner design. The corners of the rectangular cross section chamber, however, often provide a sufficient increase in friction to initiate bridging which leads to jamming. Thus, the tapered chamber having a round cross section is significantly to be preferred above either the straight or tapered chamber of a rectangular cross section, due to elimination of the corner effect.

Although it is functionally preferred, the tapered round conditioning chamber must overcome the obstacle to its employment imposed by the cost of manufacture of such chambers. Fabrication of a round tapered chamber requires development of large complicated plate forms in order to form the required conic sections. In addition to the manufacturing difficulty, the cost of scrap material generated during plate cutting adds significantly to the total cost of the chamber structure.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing in a vertical round steam conditioning chamber, having a steam supply and distribution system, a top mounted inlet, and a bottom mounted discharge, the improvement in combination with such conditioning chamber comprising means for providing a stepwise expanding diameter from the top to the bottom of said conditioning chamber and means for changing the rate of expansion of said diameter.

The foregoing and other aspects will become apparent from the following detailed description of the invention when considered in conjunction with the accompanying drawings.

BRIEF DESCRIPTION OF THE DRAWINGS

FIG. 1 is a schematic elevation view illustrating a conditioning chamber according to the present invention; and FIG. 2 is an enlarged fragmentary view of the portion of the chamber of FIG. 1 within circle 2.

DETAILED DESCRIPTION

FIG. 1 and FIG. 2, viewed together, clearly illustrate details of the round expanding modular steam chamber of the present invention.

Chamber 200 is shown here to consist of seven cylindrical modules 110, 111, 112, 113, 114, and 115. Inlet 100 and discharge 190 are shown at the top and bottom, respectively, of the vertical chamber 200. Since conditioning may precede a number of different processes, a transition module 180 is illustrated below module 115 and above discharge 190. The precise shape of inlet 100 is determined by the type of material supply existing in the mill, while the shape of the transition module 180 and discharge 190 are determined by the most appropriate feed geometry for the succeeding operation. Each cylindrical module is shown with a steam inlet 125 (only numbered in modules 112 and 113), a temperature probe inlet 150 (only numbered in module 110), and an observation window 120 (only numbered in modules 110 and 113). A steam manifold 210 is connected to a steam source (not illustrated) and distributes steam from such source through steam conduits 211 through 218 to all modules as shown. Steam flow is controlled in each conduit by steam control valves 11–18 on manifold 210. Also, a maintenance door 320 is provided in transition module 180 and module 113. These provide access for cleaning and maintenance and may be installed every 10 to 20 feet up the chamber, as needed.

Because of their cylindrical shape, modules 110–115 are readily formed from rectangular plate sections. A cylindrical module of desired diameter is made by roll forming a rectangular plate and joining the abutting ends. After the required number of modules have been formed for the desired steam conditioning chamber height, at least one steam inlet port 125 is installed in each module. A temperature probe inlet and an inspection window is also installed in each module, as desired. A flange is provided at the top and bottom of each module to permit stacking and joining of the modules. If necessary, a gasket material (not shown) is interposed between flanges of adjoining modules during assembly. This may be necessary to assure that steam will not escape from the chamber at the flange joints.

The view presented in FIG. 2 illustrates one method of joining the stacked modules. In this case, module 111 is equipped with flange 130, and module 112 is equipped with flange 131. Flanges 130 and 131 provide sufficient radial overlap to prevent module 111 from telescoping downward into module 112 despite the discrepancy between the diameters of the two modules. As illustrated here, flanges 130 and 131 could be formed from angle iron and welded or otherwise attached to the cylindrical modules. However, depending upon what forming equipment is available, such flanges could be integrally formed on the cylindrical module either before or after the cylinder is formed. The flanges of the stacked modules are preferably bolted together to facilitate shipping and assembly of the conditioning chamber in a multipiece condition.

For a given overall height of chamber 200, the height of each module and the diameter difference between adjoining modules is determined by the grain being processed. Thus, while corn may require one aspect ratio for each module, oats or sorghum may require considerably different aspect ratios. It is conceivable that the required aspect ratio for the modules may change as the bottom of the chamber is approached. This could occur in the case where the expansion characteristic of the grain or other particulate material increases as it travels downward through the conditioning chamber 200. In any case, the present construction using cylindrical modules and flanges to accommodate diameter changes, provides considerable versatility to the conditioning chamber, and may even permit periodic changes in the chamber expansion rate in order to accommodate different particulate expansion characteristics.

Distribution of steam within each module may be by any of the common presently available injection devices. For example, a straight perforated tube, a U-shaped perforated tube, or a circular perforated tube extending from steam inlets 125 into the chamber module may be used for exposing the particulate material or feed grain to the steam conditioning.

Inlet 100 and discharge 190 are usually already in the mill and are dictated by the nature of the feed grain or other particulate material being conditioned and by the next subsequent processing step. It may thus be required that transition module 180 have a circular cross section at the top and an elongated oval cross section at its juncture with discharge 190. Such would be the case if the subsequent processing step were a roll flaking operation.

This invention provides a significant improvement to the technology of steam conditioning of feed grains, plastic pellets, or other particulate material which requires steam conditioning. The method for fabricating the conditioning chamber from cylindrical modules provides a novel and relatively low cost method for producing a round expanding conditioning chamber and simplifies later additions of insulating wrap or other such covers. It, therefore, facilitates increased production and profitability in such operations.

What is claimed is:

1. In a vertical round steam conditioning chamber having a top mounted inlet, a bottom mounted discharge, and a steam supply and distribution system, the improvement, in combination with said conditioning chamber, comprising:

means for providing a stepwise expanding diameter from the top to the bottom of said conditioning chamber; and means for changing the rate of expansion of said diameter.

2. The combination of claim 1, wherein the means for providing a stepwise expanding diameter comprises a plurality of stacked hollow cylindrical modules, each of said modules having a diameter larger than that of the module stacked above and smaller than that of the module below.

3. The combination of claim 2, wherein the means for changing the rate of expansion of said diameter comprises a plurality of modules having various ratios of height to diameter, each of which can be substituted for an appropriate module having a different ratio of height to diameter.

4. A vertical steam conditioning chamber, for feed grains and other steam conditioned particles, which resists plugging and bridging due to expansion and softening of said particles, said chamber having a steam supply, a vertical columnar housing, a top-fed inlet chamber for receiving said particles, and a bottom discharge chamber for discharging conditioned particles for further processing, comprising:

a plurality of stacked hollow cylindrical modules, each module having a diameter larger than that of the module stacked above and smaller than that of the module upon which it is stacked;

means for preventing telescoping of upper modules into lower modules of said plurality of modules, for joining said modules in a pressure tight stack, and for joining said inlet chamber and said discharge chamber to said stack; and means for introducing steam into at least one module.

5. The vertical steam conditioning chamber of claim 4, wherein the means for preventing telescoping of said modules, for joining said modules, and for joining said inlet chamber and said discharge chamber to said stack comprises an outwardly projecting flange at the upper end and at the lower end of each module, each said upper flange mating with the lower flange of the module above and each said lower flange mating with the upper flange of the module below, the upper flange of the top-most module mating with a flange on the bottom of the inlet chamber and the lower flange of the bottom-most module mating with a flange on the top of the discharge chamber.

6. The vertical steam conditioning chamber of claim 4, wherein the means for introducing steam into at least one module comprises:

a steam manifold; and at least one steam conduit connected to at least one cylindrical module, for conducting steam from said steam manifold to said cylindrical module.

* * * * *